July 31, 1956   T. W. JOHNSON   2,756,656
DELAYED LIFT FOR CULTIVATORS
Filed April 1, 1954   2 Sheets-Sheet 1
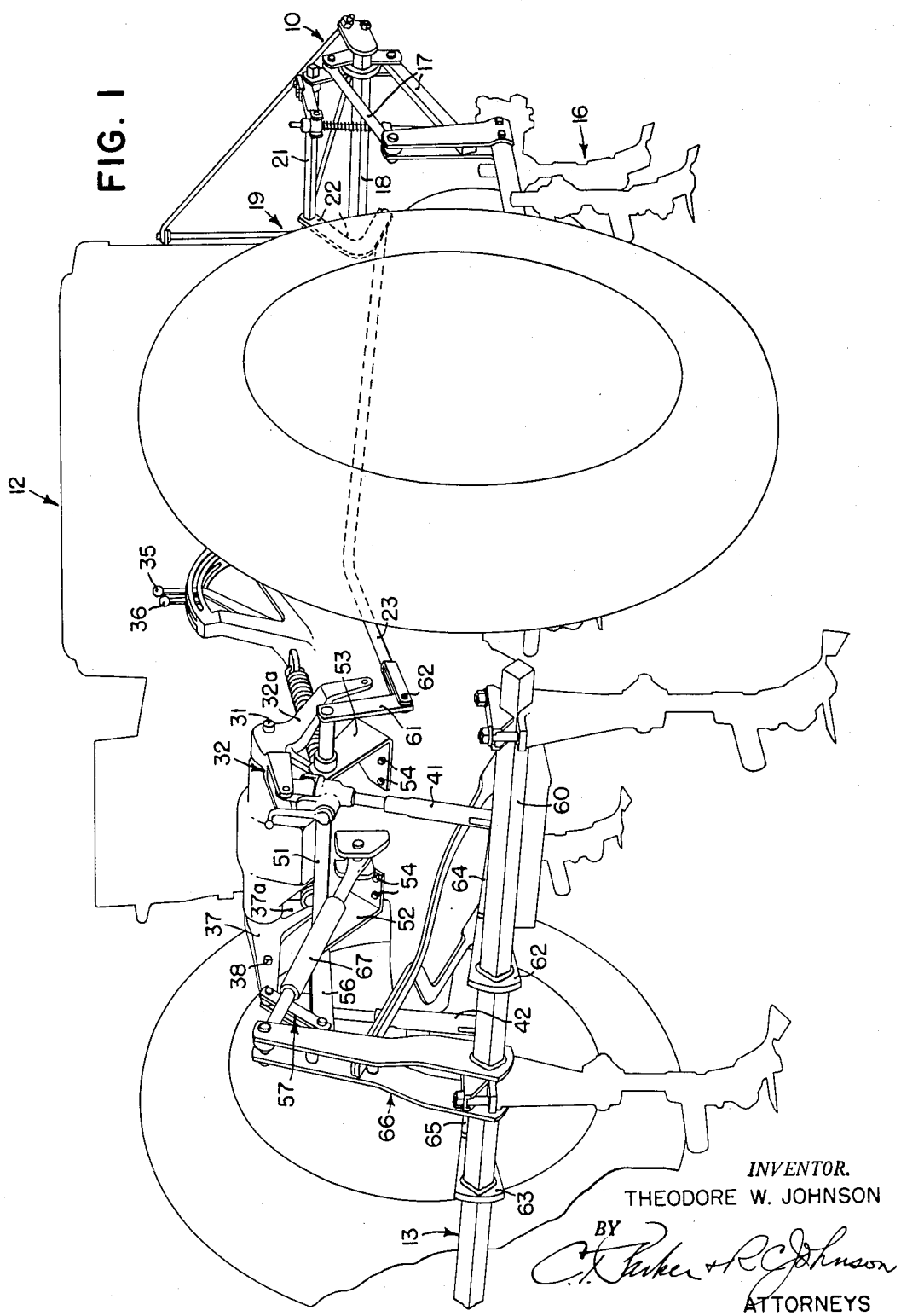
INVENTOR.
THEODORE W. JOHNSON
BY
ATTORNEYS July 31, 1956  T. W. JOHNSON  2,756,656
DELAYED LIFT FOR CULTIVATORS
Filed April 1, 1954  2 Sheets-Sheet 2
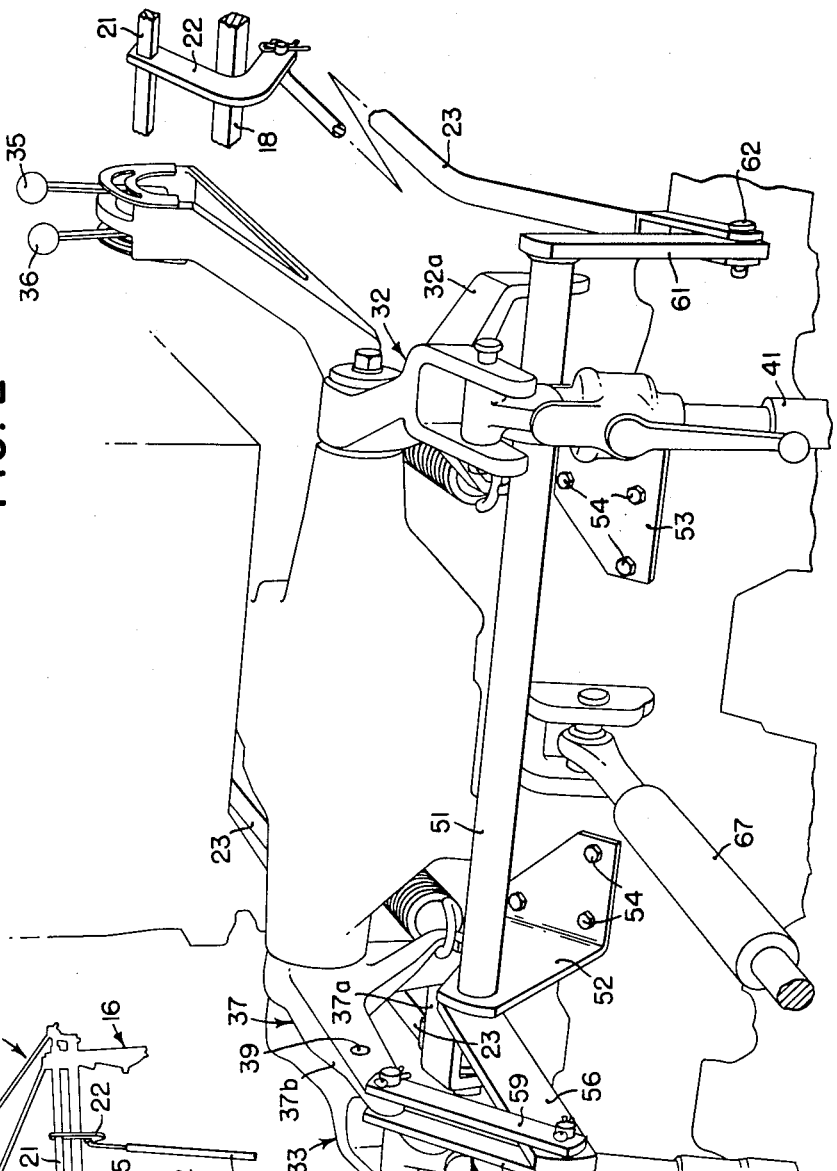
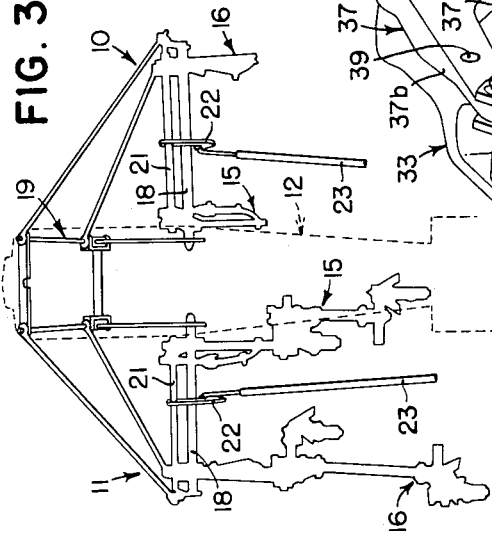
INVENTOR.
THEODORE W. JOHNSON
BY
ATTORNEYS United States Patent Office 2,756,656
Patented July 31, 1956

2,756,656

DELAYED LIFT FOR CULTIVATORS

Theodore W. Johnson, Des Moines, Iowa, assignor to Deere Manufacturing Co., Dubuque, Iowa, a corporation of Iowa Application April 1, 1954, Serial No. 420,299

6 Claims. (Cl. 97—46.39)

The present invention relates generally to agricultural implements, and more particularly to ground-working implements adapted to be supported on and propelled by a farm tractor or the like. More particularly, the invention concerns a new and useful improvement in tractor-mounted cultivators.

The object and general nature of the present invention is the provision of a delayed lift attachment for tractor-mounted cultivators, by which the front cultivator units may be raised and lowered independently of the rear cultivator units, and vice-versa, whereby, when approaching the ends of the row or rows being cultivated the front and rear cultivator units may be brought to substantially the same point on the surface of the ground before raising them into a transport or inoperative position.

More specifically, it is a feature of the present invention to provide means in the form of an attachment making it possible to transform a tractor-mounted cultivator of the selective-lift type into one of the delay-lift type, a selective-lift type of tractor-mounted cultivator being one in which the right-hand front cultivator unit or units are raised or lowered independently of the left-hand cultivator unit or units.

It is an additional feature of this invention to provide a delayed lift attachment for tractor-mounted cultivators of the type in which the tractor is provided with two separate and independently operated power lift units, whereby one of said units may be connected to operate both the right- and left-hand front cultivator units while the other power lift unit may be connected to raise and lower the rear cultivator unit or units.

These and other objects and advantages of the present invention will be apparent to those skilled in the art after a consideration of the following detailed description of the preferred embodiment of the invention, taken in conjunction with the accompanying drawings, in which:

Figure 1 is a perspective view of a tractor mounted cultivator in which the principles of the present invention have been incorporated, certain conventional parts being shown in outline.

Figure 2 is an enlarged fragmentary perspective view of the upper rear part of the implement shown in Figure 1.

Figure 3 is a fragmentary plan view of the front portion of the implement shown in Figure 1.

Referring first to Figs. 1 and 3, a pair of right- and left-hand front rig units 10 and 11 are shown as supported at the front of a farm tracor 12, the rear of the tractor receiving a rear cultivator unit 13. So far as the present invention is concerned, the individual rigs of the front and rear rig units are of generally conventional construction. The front rig units include inner and outer rigs 15 and 16 connected through parallel links 17 with a laterally outwardly extending crossbar 18, the latter being supported on the front of the tractor through hitch means 19. The left-hand rig unit 11 is of similar construction, involving substantially identical parts, except that certain may be left-hand, rather than right-hand, and therefore the same reference numerals mentioned above have been applied to the corresponding parts of the left-hand rigs.

Mounted on each of the outwardly extending supporting bars 18 is a rockshaft 21 that is operatively connected with the rigs 15 and 16 to raise and lower them. A downwardly extending arm 22 on each rockshaft 21 receives the associated push pipe 23 by which the front rig units are controlled. The rear ends of the push pipes or rig-operated members 23 are adapted to be connected with the hydraulic power lift system of the tractor 12, as will be explained in detail below.

The tractor 12 is of convenional construction, so far as the present invention is concerned, and includes a power lift system of the hydraulic type substantially the same as that shown in the copending application, Serial No. 271,346, filed February 13, 1952 by Raymond H. Heller et al., now U. S. Patent 2,680,401. Briefly, such a power lift system is hydraulically operated from a suitable engine-driven hydraulic pump and includes a first power means connected to operate a transverse rockshaft 31, to the end of which right- and left-hand lift levers 32 and 33 are connected. The shaft is operated by a piston and cylinder arrangement under the control of a tractor-carried outside valve lever 35. An adjacently mounted valve lever 36 is connected to control a second power means that includes a hydraulic piston and cylinder unit connected to operate a left-hand inside lift arm or lever 37. The power lift system is such that the lift lever 37 may be operated independently of the other lift levers 32 and 33, and the latter levers may also be operated independently of the lift lever 37. Optionally, however, the lift levers 33 and 37 may be interconnected, as by a pin 38 insertable through aligned openings 39 in the arms 33 and 37, and then, by suitably conditioning the hydraulic system, the outside valve lever 35 may be operated to actuate all of said lifting levers 32, 33 and 37 simultaneously by power derived from both of said power means. The details of this type of mechanism are disclosed in said copending application, Serial No. 271,346.

Conventionally, the rear cultivator unit is connected by lift links 41 and 42, either or both of which may be adjustable, with the lift levers 32 and 33, whereby operation of the rockshaft 31 serves to raise and lower the cultivator unit 13. Conventionally, also, the right-hand push pipe 23 for the right-hand cultivator unit 16 is connected with an extension 32a formed on the right-hand lift lever 32, and the left-hand cultivator unit has its push pipe 23 connected with an extension 37a formed on the lift lever 37, which lever, it will be remembered, is controlled by the inner valve lever 36. Thus, in the conventional arrangement, by removing the pin 38, and properly adjusting the hydraulic system, the front cultivator units may be operated independently, the rear cultivator unit and right-hand front cultivator unit being raised and lowered together by moving the outside valve lever 35 while the left-hand front cultivator unit is controlled by the inside valve lever 36.

The ability to raise and lower the left and right front cultivator units independently of one another is known as "selective lift," but in some territories it is desired to raise and lower both the front right- and left-hand units together but independently of the rear cultivator unit or units, and the principal object of the present invention is to provide means in the nature of an attachment for the tractor and cultivator structure described above so as to make it possible to utilize the separate hand levers 35 and 36 to raise and lower the right- and left-hand front sections independently of the rear cultivator unit, and vice-versa.

The delayed lift attachment of the present invention comprises a transverse rockshaft 51 mounted for rocking movement in a pair of brackets 52 and 53 attachable to the rear portion of the tractor through means, such as stud bolts 54 or the like. Secured to the left end of a cross shaft 51 is a generally rearwardly extending arm 56, the latter arm being connected by link means 57, preferably comprising a pair of straps 58 and 59, to the rearwardly extending section 37b of the left-hand inside power-operated lift lever 37. The arm 56 is substantially parallel to and of the same effective length as the arm 37b. The lever 37 includes a laterally outwardly and downwardly disposed extension 37a mentioned above and to which the rear end of the left-hand front cultivator push part 23 is pivotally connected. The right end of the cross shaft 51 carries a generally downwardly extending arm 61. The rear end of the right-hand cultivator push part 23 is pivotally connected by a quick attachable pivot pin 62 to the lower end of the arm 61, the push pipe 23 being disconnected from the right-hand lift lever extension 32a when arranging the outfit for delayed lift action. The right downwardly extending arm 61 extends generally parallel to the inside lift lever extension 37a.

In operation, with the delayed lift attachment mounted on the tractor as described above, both of the right- and left-hand front cultivator units are operated together by operating the inside valve lever 36, this valve lever operating the inside lift lever 37 which, through the link 57 and arm 56, also operates the cross shaft 51 to the right end of which the right-hand arm 61 is connected, both right- and left-hand cultivating units thus being operated simultaneously by moving the inside valve lever 36. The outside valve lever 35 operates in the usual way to rock the power lift shaft 31 and the outside right- and left-hand lift levers 32 and 33. These lift levers are connected through the lift links 41 and 42 to raise and lower the draft links 64 and 65 to which a pair of forwardly extending brackets 62 and 63, fixed to the tool bar 60 of the rear cultivator unit 13, are connected. The cultivator unit 13 also includes a generally vertically extending mast section 66 that is connected at its upper end to the upper link 67 that forms a part of the tractor 12.

While I have shown and described above the preferred structure in which the principles of the present invention have been incorporated, it is to be understood that my invention is not to be limited to the particular details shown and described above, but that, in fact, widely different means may be employed in the practice of the broader aspects of this invention.

What I claim, therefore, and desire to secure by Letters Patent is:

1. The combination with a tractor having power lift apparatus including a first power operated means including a pair of operating levers, one at each side of the tractor, and a second power operated means including an operating lever disposed at one side of the tractor adjacent one of said pair of levers movable about an axis coincidental with the axis of said pair of operating levers, of an attachment comprising a cross shaft, means rockably supporting said shaft on said tractor for movement relative thereto about an axis spaced from and parallel to the axis of movement of the operating lever of said second power operated means, means connnecting one end of said shaft with the operating lever of said second power operated means, and implement actuating means connected with said cross shaft at the other side of the tractor.

2. The combination with a tractor of the type having a power lift system having two separably operable lift means, each movable about an axis, of a pair of right and left-hand separably operable front ground working means; a rear ground working means, means connecting the rear ground working means with one of said separably operable lift means, means connecting one of said front ground working means with the other of said separably operable lift means, an attachment part detachably and movably mounted on the tractor and swingable relative thereto about an axis spaced from said first mentioned axes, means connecting said part with said other lift means, and means connecting said part with the other of said front ground working means.

3. The combination with a tractor of the type including a power lift system that comprises a pair of lift arms, mechanism including a first valve lever for controllably operating said lift arms, a third lift arm, and mechanism including a second valve lever for controllably operating said third lift arm, of a pair of front cultivator rigs, a rear cultivator rig means, means connecting said rear rig means with said pair of lift arms, means connecting one of said front rigs with said third lift arm, a cross shaft, means rockably carrying said shaft on the tractor, an arm fixed to each end of said cross shaft, means connecting one of said latter arms with one of said front rigs, and means connecting the other of said latter arms with said third arm.

4. The combination with a tractor having power lift apparatus including a first power operated means including a pair of operating levers, one at each side of the tractor, and a second power operated means including an operating lever disposed at one side of the tractor adjacent one of said pair of levers and having two arm sections, one extending generally rearwardly and the other extending generally downwardly, of an attachment comprising a cross shaft, means rockably supporting said shaft on said tractor generally transversely thereof, an arm fixed to the end of said cross shaft adjacent the operating lever of said second power operated means, said arm being generally parallel to said generally rearwardly extending arm section and approximately of the same length, a link pivotally connecting the outer end of said arm and said last mentioned lever, and a second arm on the other end of said shaft, said second arm being generally parallel to said generally downwardly extending arm section.

5. In combination with a tractor having a longitudinal body and a power lift system including a pair of rockable members and mechanism for independently operating the rockable members; a cultivator unit including a rear cultivator rig supported at the rear of and transverse of the tractor body, and a pair of cultivator rigs supported at respective opposite sides of the tractor body and forward of the rear rigs; linkage means connecting the rear rig to one of the rockable members, the linkage means being operative to provide vertical adjustment of the rear rig in response to rocking of said one of the rockable members; a transverse shaft rockably and detachably mounted on the tractor independent of the power lift system; means connecting one of the pair of cultivator rigs to the transverse shaft, said latter means being operative upon rocking of the shaft to adjust said one cultivator rig vertically; means connecting the other of the pair of cultivator rigs to the other of the rockable members, said latter means being operative upon rocking of said other rockable member to adjust said other cultivator rig vertically; and interconnecting linkage between the other of the rockable members and the transverse shaft for imparting rocking motion to the latter to cause the pair of cultivator rigs to be adjusted vertically in unison.

6. In combination with a tractor having a longitudinal body and a power lift system including a pair of rockable members and mechanism for independently operating the rockable members; a cultivator unit including a rear cultivator rig supported at the rear of and transverse of the tractor body, and a pair of cultivator rigs supported at respective opposite sides of the tractor body and forward of the rear rigs; linkage means connecting the rear rig to one of the rockable members, the linkage means being operative to provide vertical adjustment of the rear rig in response to rocking of said one of the rockable members; a shaft rockably and detachably mounted on the tractor independent of the power lift system; means connecting one of the pair of cultivator rigs to the shaft, said latter means being operative upon rocking of the shaft to adjust said one cultivator rig vertically; means connecting the other of the pair of cultivator rigs to the other of the rockable members, said latter means being operative upon rocking of said other rockable member to adjust said other cultivator rig vertically; and interconnecting linkage between the other of the rockable members and the shaft for imparting rocking motion to the latter to cause the pair of cultivator rigs to be adjusted vertically in unison.

References Cited in the file of this patent

UNITED STATES PATENTS

| | | |
|---|---|---|
| 1,911,306 | Cady | May 30, 1933 |
| 2,386,156 | Orelind et al. | Jan. 30, 1945 |
| 2,424,372 | Silver | July 22, 1947 |